United States Patent
Venkataraman et al.

(10) Patent No.: US 7,911,857 B1
(45) Date of Patent: Mar. 22, 2011

(54) PREAMBLE DETECTION AND POSTAMBLE CLOSURE FOR A MEMORY INTERFACE CONTROLLER

(75) Inventors: Srinivas Venkataraman, Santa Clara, CA (US); Praveen Garapally, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 9 days.

(21) Appl. No.: 12/482,190

(22) Filed: Jun. 10, 2009

(51) Int. Cl.
*G11C 7/00* (2006.01)
(52) U.S. Cl. .................... 365/189.15; 365/193; 365/194; 365/154
(58) Field of Classification Search ........... 365/189.011, 365/189.15, 193, 93, 154, 194
See application file for complete search history.

(56) References Cited

U.S. PATENT DOCUMENTS

2005/0024972 A1* 2/2005 Schaefer ...................... 365/222
* cited by examiner

*Primary Examiner* — Hoai V Ho
*Assistant Examiner* — Jason Lappas
(74) *Attorney, Agent, or Firm* — Harrity & Harrity, LLP

(57) ABSTRACT

A memory controller, such as a memory controller for reading data received from a DDR SDRAM memory, may detect the beginning and end of a read cycle. The memory controller may include a preamble detection circuit to receive a strobe signal and output a first control signal indicating detection of a preamble window in the strobe signal that indicates a beginning of the read cycle, where the first control signal is delayed based on a selectable delay period applied to the first control signal. The memory controller may further include a first gate to, based on the first control signal, either output the strobe signal for reading of the data lines or block the strobe signal, and the control logic to set an amount of the selectable delay period for the preamble detection circuit.

9 Claims, 8 Drawing Sheets

PREAMBLE DETECTION AND POSTAMBLE CLOSURE FOR A MEMORY INTERFACE CONTROLLER

BACKGROUND

Random access memory (RAM) is a type of storage for computing devices. RAM is typically associated with volatile memory that is implemented in integrated circuits and in which stored information is lost when power provided to the RAM is switched off.

One type of RAM is known as DDR SDRAM (double-data-rate synchronous dynamic random access memory). DDR SDRAM is typically used in computing applications that require high bandwidth and low latency memory access. One version of this memory technology is known as DDR3 SDRAM, which can provide for high performance data rates, high bandwidth, high density, and low power consumption relative to earlier generations of SDRAM.

The high bandwidth and high operating frequencies required to drive DDR SDRAM can be problematic as they can make the controller to memory interface electrically complex due to signal integrity considerations. A DDR3 SDRAM controller and associated memory may perform read and write operations synchronously based on a periodic signal transmitted over a "strobe" line. Static and dynamic timing variations between the strobe line and a data line can cause memory errors. Static variations that cause timing skew between the strobe and data lines may be due to, for example, on-die process and wire variations across strobe and data logic, on-chip power supply grid variations, package and board interconnect, and material variations. Dynamic timing variations may be caused by short or long term voltage drift and temperature changes during functional operation of the interface The strobe line may be used to signal the beginning and end of a burst of data. A read "preamble cycle" may be used to indicate the beginning of a read burst and a "postamble cycle" may be used to signal the end of the read burst. For high frequency memory operation, detection of the read preamble window and appropriate postamble closure at the controller is not trivial as board round trip delays, and static and dynamic timing variations can cause the preamble window to cross one or more clock cycle boundaries.

Existing techniques to detect read preamble and postamble cycles may be based on an echo clock emitted from a memory controller. This technique, however, may require dedicated input/output (I/O) pins and may not be effective when preamble arrival times cross a clock cycle boundary.

SUMMARY

One aspect, as described herein, is directed to a device comprising a memory configured to store data and a memory controller connected to the memory via a number of data lines, for receiving data signals, and a strobe line, for receiving a strobe signal used to control reading of the data lines. The memory controller may include a preamble detection circuit to receive the strobe signal and output a first control signal indicating detection of a preamble window in the strobe signal that indicates a beginning of a read cycle, where the first control signal is delayed based on a selectable delay period applied to the first control signal. The memory controller may further include a first gate to, based on the first control signal, either output the strobe signal for reading of the data lines or block the strobe signal and control logic to set an amount of the selectable delay period for the preamble detection circuit.

Another aspect is directed to a device comprising a memory and a memory controller to control reading from the memory by reading data from a plurality of data lines, in which the data is read by sampling the data on rising and falling edges of a strobe signal received from the memory. The memory controller may include a preamble detection circuit including a number of flip-flops connected to sample the strobe signal on rising and falling edges of a clock cycle, a first multiplexer connected to outputs of the flip-flops and configured to select one of the outputs of the flip-flops to output from the first multiplexer, a number of serially connected delay elements connected, at a first of the serially connected delay elements, to receive an output of the first multiplexer, and a second multiplexer connected to select an output corresponding to one of the serially connected delay elements and provide the output as a first signal indicating detection of a beginning of a read cycle from the memory. The memory controller may further include a postamble closure detection circuit to output a second signal indicating an end of the read cycle from the memory and a first gate connected to output the strobe signal or block the strobe signal based on the first signal and the second signal.

Another aspect is directed to a memory controller that includes a preamble detection circuit. The preamble detection circuit may include a number of flip-flops connected to sample a memory strobe signal on rising and falling edges of a clock cycle, a first multiplexer connected to outputs of the flip-flops and configured to select one of the outputs of the flip-flops to output from the first multiplexer, a number of serially connected delay elements connected, at a first of the plurality of serially connected delay elements, to receive an output of the first multiplexer, and a second multiplexer connected to select an output corresponding to one of the serially connected delay elements and provide the output as a first signal indicating detection of a beginning of a read cycle from the memory device. The memory controller may further include a postamble closure detection circuit to output a second signal indicating an end of the read cycle from the memory; a first gate connected to output the strobe signal or block the strobe signal based on the first signal and the second signal; and control logic to output signals that control the selection of the first and second multiplexers.

Yet another implementation is directed to a method implemented in a computing device. The method may include detecting the beginning of a memory read cycle, in a memory controller, based on the sampling of a strobe signal in which the strobe signal is sampled based on a selectable delay that is dynamically determined for the memory controller during an initialization period for the computing device. The method may further include detecting the end of the memory read cycle and controlling a gate in the computing device to pass the strobe signal to a data capture portion of the computing device between a detection of the beginning and end of the memory cycle and controlling the gate to block the strobe signal to the data capture portion of the computing device otherwise.

BRIEF DESCRIPTION OF THE DRAWINGS

The accompanying drawings, which are incorporated in and constitute a part of this specification, illustrate one or more embodiments described here and, together with the description, explain these embodiments. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a memory controller may include circuitry for reading data received from a DDR SDRAM memory. The data may be received as a burst of data in which the beginning and end of the burst are signaled by a preamble signal and a postamble signal, respectively. A preamble detection circuit may be used to locate the preamble window of a read burst and a postamble closure circuit may be used to close the controller strobe logic within the postamble window of the read burst. The preamble detection circuit may implement a dynamic training algorithm to determine an amount of delay that is optimal for the particular memory interface when detecting the preamble signal.

Exemplary System Overview

Figure 1:
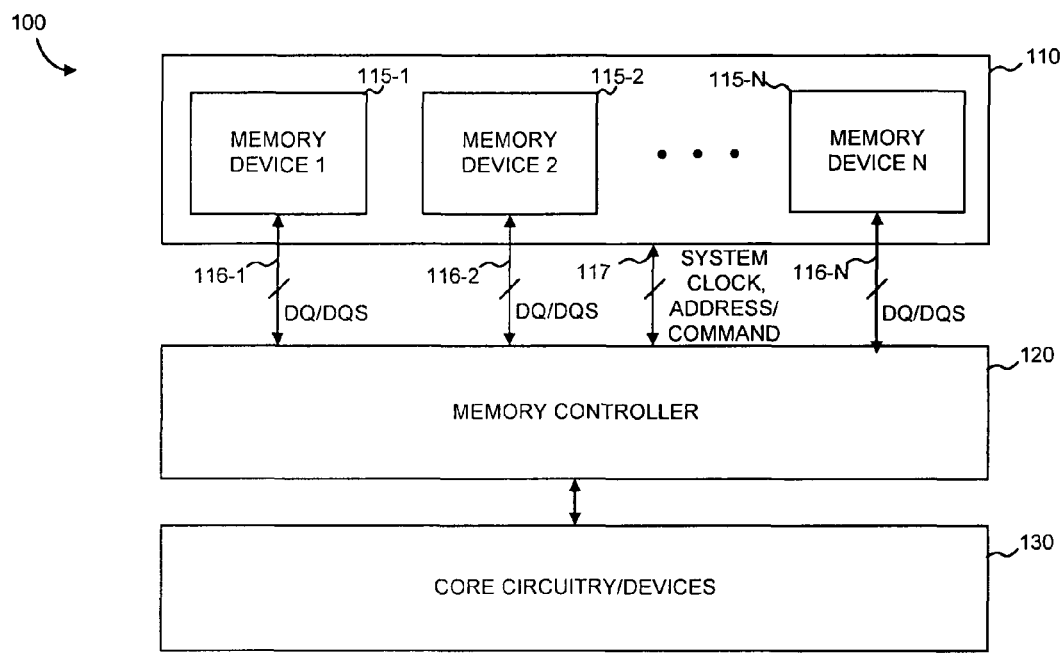
FIG. 1 is a diagram of an exemplary computing system in which concepts described herein may be implemented.

FIG. 1 is a diagram of an exemplary computing system 100 in which concepts described herein may be implemented. Computing system 100 may include a computing device that incorporates random access memory, such as DDR3 SDRAM. For instance, computing system 100 may include an ASIC (application specific integrated circuit), a FPGA (field-programmable gate array), or a circuit board that is designed to perform various functions. For example, computing system 100 may embody or be a part of a network device, such as a router, a switch, a gateway, etc. Computing system 100 may include one or more components or devices that access a fast random access memory.

As shown in FIG. 1, computing system 100 may include a memory module 110, a memory controller 120, and core circuitry/devices 130. Memory module 110 may include memory devices 115-1 through 115-N (collectively, memory devices 115). Memory devices 115 may each include, for instance, a memory such as a DDR3 SDRAM memory. In some implementations, memory module 110 may be implemented using one or more stand-alone memory devices 115. In other words, memory devices 115 may be directly connected to memory controller 120 and there may not be any physical "module" that includes the memory devices 115.

Memory controller 120 may read and write data with memory devices 115 of memory module 110. Memory controller 120 may present a single interface through which core circuitry/devices 130 can interact to store and retrieve data. Memory controller 120 may logically present the multiple memory devices 115 to core circuitry/devices 130 as a single storage space that has a capacity equal to the sum of the memory capacities of each of memory devices 115.

Memory controller 120 may read from or write data to memory module 110 using a number of data (DQ) and strobe (DQS) lines connected to each memory device 115. DQ/DQS sets 116-1 through 116-N are particularly shown in FIG. 1. Each DQ/DQS set 116 may include, for example, eight data (DQ) lines and a corresponding strobe (DQS) line. Data may be read and received with the corresponding memory device 115 in which data bits are synchronously transmitted based on the state of the DQS line. For DDR memory, for instance, data is typically "double pumped" by latching (sampling) the data on the rising and falling edges of the strobe signal. Memory controller 120 may also connect to memory module 110 using additional control and clock lines, labeled as system clock, address/command lines 117 in FIG. 1.

Core circuitry/devices 130 may include specialized circuits, general purpose processors or microprocessors, or other computing devices that connect to memory controller 120. Through memory controller 120, core circuitry/devices 130 may access memory module 110.

Figure 2:
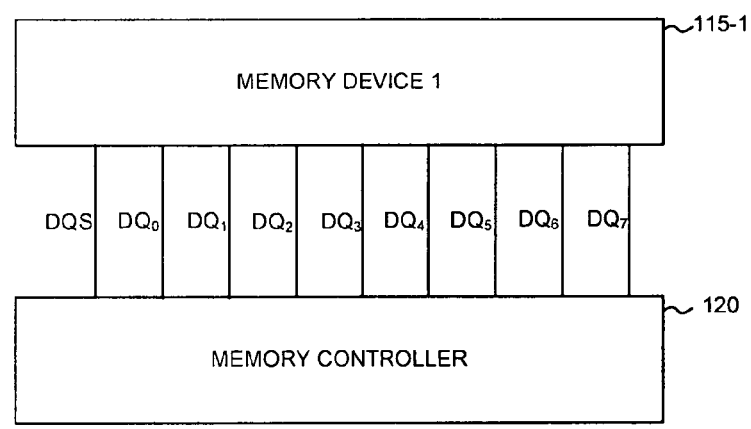
FIG. 2 is a diagram illustrating an exemplary implementation of a memory device and the memory controller shown in FIG. 1.

FIG. 2 is a diagram illustrating an exemplary implementation of memory device 115-1 and memory controller 120. In this example, eight DQ lines $DQ_0$ through $DQ_7$ connect memory device 115-1 and memory controller 120. DQ lines $DQ_0$ through $DQ_7$ may each correspond to lines used to transmit and receive data. As shown, memory device 115-1 may transmit or receive one or more byte (eight bit) groups. Each byte group may have its own corresponding DQS line. Timing for each of lines $DQ_0$ through $DQ_7$ may be controlled via the DQS line (i.e., the strobe signal). Memory devices 115-2 through 115-N may be similarly connected to memory controller 120.

Figure 3:
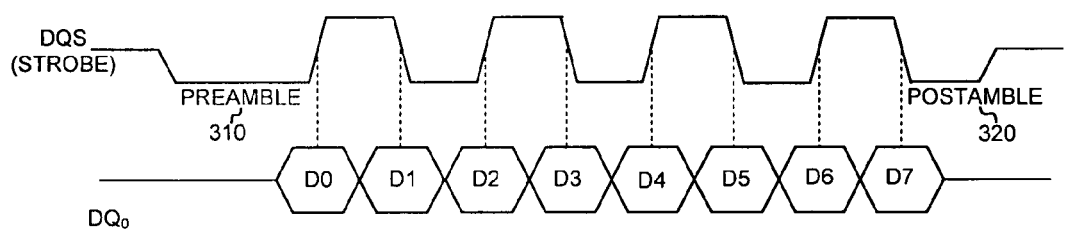
FIG. 3 is an exemplary timing diagram illustrating exemplary interaction between the DQ and DQS lines shown in FIG. 2.

FIG. 3 is an exemplary timing diagram illustrating exemplary interaction between the DQ and DQS lines shown in FIG. 2. A single DQ line, $DQ_0$, is shown in FIG. 2. Data for eight bits (labeled D0 through D7) are shown, at different times, on $DQ_0$. Each successive bit may be sampled on $DQ_0$ on both the rising and falling edges of DQS. Further, a preamble window 310 and a postamble window 320 are shown on the DQS line.

Preamble window 310 may be used by memory device 115 to signal the beginning of a read cycle. The DQS line may initially be in a tri-state (high impedance state). Memory device 115-1 may take the DQS line from tri-state to logic low to begin preamble window 310. In response, memory controller 120 should recognize the preamble window and, when the DQS line transitions to a logic high state, begin sampling data. Postamble window 320 signals the end of a data cycle. Memory device 115-1 may hold the DQS line at a logic low level for a predetermined period before placing the DQS line into a tri-state mode.

During tri-state, the inputs at the input/output (IO) pad of memory controller 120 may be held at the mid-point of the IO voltage by an on-die termination (ODT). To avoid propagating spurious edges through the logic that handles the strobe signal, the DQS line should be effectively gated to isolate the tri-state signal. However, due to relatively short cycle times when reading at high data rates, read preamble arrival time delays at the controller can be larger than one or more memory clock cycles. The spread in arrival times can depend on factors such as silicon (on-die) process variations on memory devices 115 and controller 120, silicon delay variations due to the effect of voltage, temperature, and board interconnect delays. Because the preamble and postamble window can be relatively short, accurately and precisely detecting preamble window 310 and postamble window 320 can be critical to error-free memory operation.

DQS Gating Circuit

Figure 4:
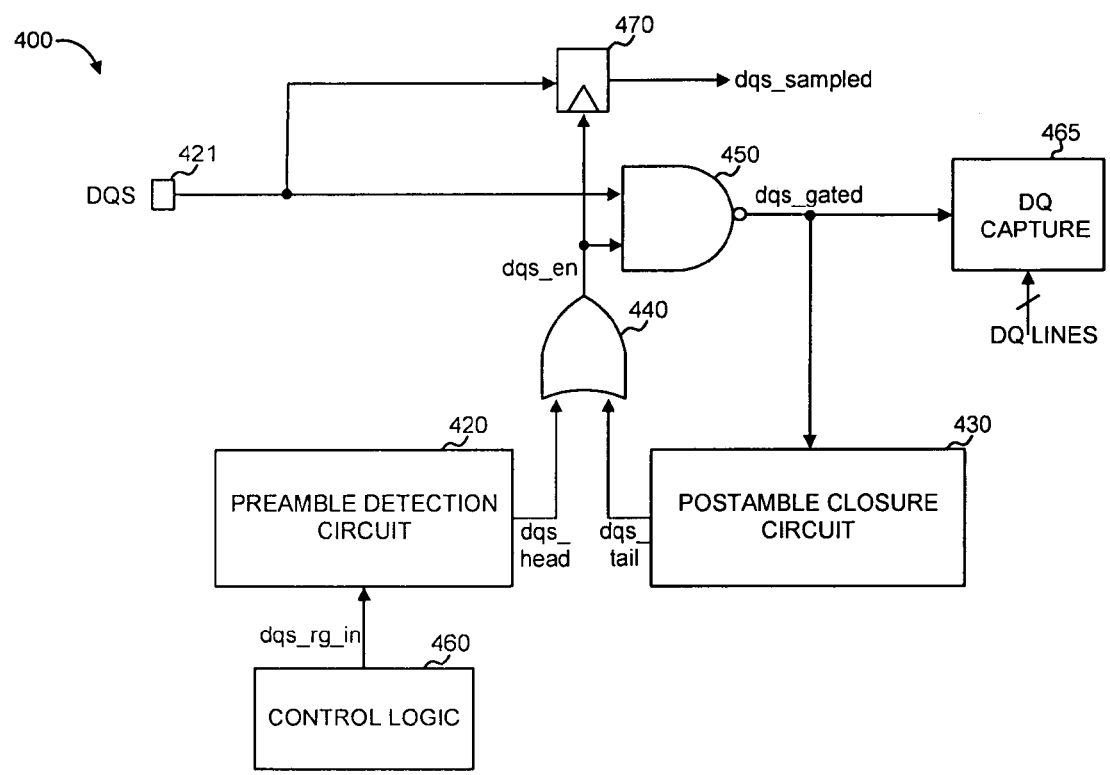
FIG. 4 is a block diagram illustrating an exemplary system for gating the DQS signal when reading data from a memory module.

FIG. 4 is a block diagram illustrating an exemplary system 400 for gating the DQS signal when reading data from memory devices 115 or memory module 110. System 400 may be implemented in memory controller 120. In one implementation, one or two copies of system 400 may be implemented in memory controller for each connected memory device 115-1 through 115-N. System 400 may generally operate to detect the preamble and postamble cycles on the DQS line. In response, system 400 may open a gate to provide the DQS signal, which may then be used to sample the data bits on the DQ lines. Outside of the read preamble and postamble cycles, system 400 may close the gate for the DQS line, thus isolating the DQS tri-state from the data sampling circuitry. In this manner, spurious DQS edges, caused by the indeterminate nature of the tristate, can be blocked out of the receive DQS logic inside the controller.

As shown, system 400 may include a preamble detection circuit 420, postamble closure circuit 430, control logic 460, and DQ capture logic 465. System 400 may also include gates 440 and 450, and a flip-flop 470. Outputs of preamble detection circuit 420 may be input to first gate 440. The incoming DQS signal may be received on DQS pad 421 and input to gate 450, which may also receive the output of gate 440. Gate 450 may act as the gate that controls providing of the DQS signal to the DQ IO capture logic 465. In other words, gate 450 may pass or block the DQS as a clock capture signal to DQ capture logic 465. Based on the signal output from gate 440 (labeled as "DQS_en"), gate 450 may either pass the DQS signal or block the DQS signal. That is, DQS_en may control gate 450 to either pass or block the incoming DQS signal. System 400 may also include control logic 460. Control logic 460 may control the training and configuration of preamble detection circuit 420. Control logic 460, in some implementations, may be implemented by memory controller 120 as logic that is common to each implementation of system 400. Control logic 460 may particularly provide signals, such as dqs_rg_in and mux_control_0-3, to control the operation of preamble detection circuit 420.

As mentioned, DQ capture logic 465 may operate to sample the DQ lines based on the DQS signal. The sampling may be performed in the manner shown in FIG. 3.

A flip-flop 470 is also shown in system 400. Flip-flop 470 may be connected to the DQS line and clocked by dqs_en. Flip-flop 470 may be used to sample the DQS signal during training of preamble detection circuit 420, which is described in more detail below. Although flip-flop 470 is illustrated separately from preamble detection circuit 420, conceptually, flip-flop 470 effectively functions as part of the preamble detection.

As shown in FIG. 4, gate 440 and gate 450 may include an OR gate and a NAND gate, respectively. In alternative implementations, gate 440 and gate 450 may be implemented as another logic gate, or a combination of other gates. Gate 440 may generally operate to enable gate 450 to pass the DQS signal. For instance, when preamble detection circuit 420 indicates that the preamble window has been detected but postamble detection circuit 430 has not yet indicated that the postamble window has been detected, the output of gate 440, dqs_en, may be set to a logic 1, thereby enabling second logic gate 450 to pass the DQS signal. Before the preamble window is detected, dqs_en may be output by gate 440 as logic zero, thereby disabling gate 450 and isolating the DQS input line from the output of gate 450.

Figure 5:
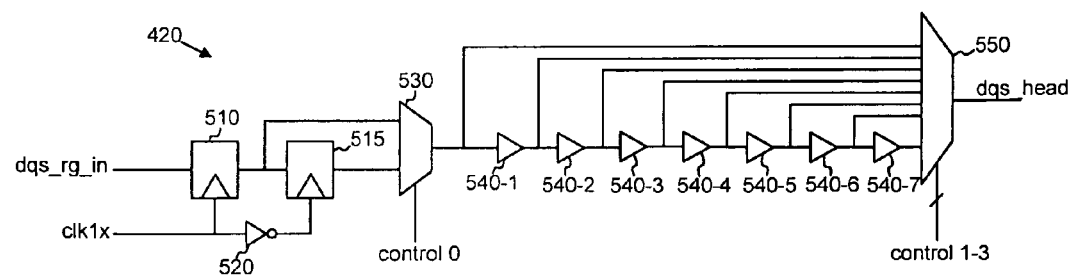
FIG. 5 is a diagram illustrating an exemplary implementation of a preamble detection circuit.

FIG. 5 is a diagram illustrating an exemplary implementation of preamble detection circuit 420. Preamble detection circuit 420 may include first flop-flop 510 (FF1) and second flip-flop 515 (FF2). FF1 510 may be connected to the input signal, dqs_rg_in, and may sample this signal on the rising edges of clock signal clk1$x$. Clk1$x$ may be a clock signal generated to have a frequency equal to the frequency of the DQS signal when it is active. Clk1$x$ may be inverted by inverter 520 and then used by FF2 515 to sample its input. FF1 510 and FF2 515 may collectively operate to sample their inputs on the rising and falling edges of clk1$x$. A multiplexer 530 may be used to select between the outputs of FF1 510 and FF2 515. The output of multiplexer 530 may be serially passed through seven buffers 540-1 through 540-7 to create eight inputs (taps) to second multiplexer 550. Each buffer 540 may act as a delay element. Multiplexers 530 and 550 may be controlled by control logic 460, via the four control lines (FIG. 4, mux_control_0-3), one of which may be used to control multiplexer 530 (mux_control_0) and the others used to control multiplexer 550 (mux_control_1-3).

In the operation of preamble detection circuit 420, control logic 460 may set multiplexer 530 to select sampling of the DQS signal on either the rising edge of clk1$x$ (FF1 510) or its falling edge (FF2 515). Control logic 460 may set multiplexer 550 to select the output of FF1/FF2 after a delay of between zero and seven delay elements (i.e., buffers 540-1 through 540-7). Delay elements 540 may each introduce a relatively short delay, such as 15-40 picoseconds per buffer. Control logic 460 may select the delay buffer 540 that corresponds to an optimal position within the preamble window on the DQS line. Determination of the optimal buffer will be described in more detail below.

Figure 6:
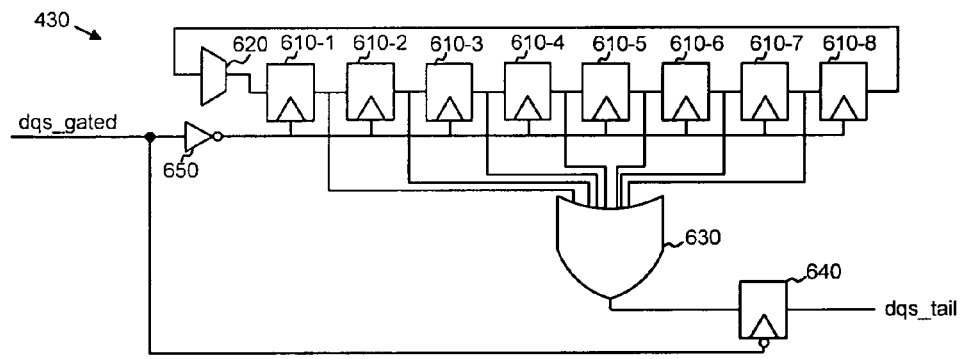
FIG. 6 is a diagram illustrating an exemplary implementation of a postamble closure detection circuit.

FIG. 6 is a diagram illustrating an exemplary implementation of postamble detection circuit 430. Postamble detection circuit 430 may include a series of flip-flops 610-1 through 610-8. Corresponding multiplexers 620-1 through 620-8 may have an input connected to the outputs of flip-flops 610. The other input of each of multiplexers 620 may be hardwired to a logic zero or one value. In particular, the other input of multiplexers 620-1 through 620-7 may be tied to a logic zero and the other input of multiplexer 620-8 may be tied to a logic one. The select line of multiplexers 620 may be connected to a stobe reset signal, dqs_reset, which may set the initial value of flip-flops 610.

Multiplexer 620 may also act to provide a timing delay equal to the delay of the multiplexer propagation time. Flip-flops 610 may propagate their data based on an input positive clock edge signal, where the gated DQS (dqs_gated) signal is used as the clock. An inverter 650 may process dqs_gated before it is sent to flip-flops 610.

Flip-flops 610 implement a ring counter. An initial value of the ring counter may be set, by activating dqs_reset, at [00000001]. With every rising edge at flip-flops 610, the ring counter shifts its content. The ring counter implemented by flip-flops 610 and multiplexers 620 may thus change its value as follows: [00000001], [10000000], [01000000], [00100000], [00010000], [00001000], [00000100], and [00000010].

As further shown in FIG. 6, the output of flip-flops 610 may be input to logical OR gate 630. The output of OR gate 630 may be input to negative edge flip-flop 640. The output of OR gate 630 and flip-flop 640 generates dqg_tail, which may become active with the first falling edge of dqs_gated and inactive with the last falling edge of dqs_gated. In this manner, postamble detection circuit 430 essentially counts the number of cycles of dqs_gated, after detection of the preamble window, and becomes inactive after the final cycle in a read burst. The postamble circuit may assert dqs_tail with the first rising DQS edge and de-assert dqs_tail after counting 8 rising DQS edges. The read burst length may be fixed at 8 (4 rising and 4 falling strobe edges to capture 8 bits of data) and the circuit may be designed to work with two back to back bursts of 8 data bits (that is, eight rising and eight falling strobe edges are expected). The purpose of falling edge flip-flop 640 may be to prevent any glitch on dqs_tail, which can potentially happen as a logic 1 cycles through the ring counter on every rising dqs edge. Any glitch on dqs_tail enable can potentially close NAND 450 in circuit 400, causing the strobe to be blocked in the middle of a valid read burst."

Figure 7:
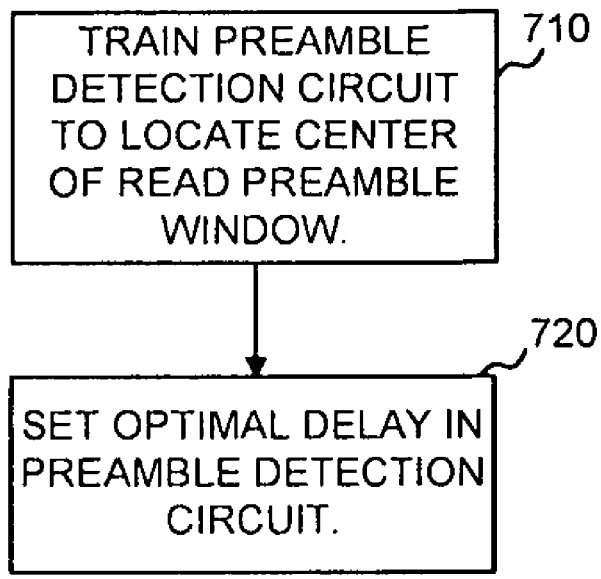
FIG. 7 is a flow chart illustrating exemplary operations associated with operating memory controller with respect to the detection of the read preamble.

FIG. 7 is a flow chart illustrating exemplary operations for operating memory controller 120 with respect to the detection of the read preamble and postamble signals. Memory controller 120 may initiate training to enable preamble detection circuit 420 to obtain a potentially optimal dqs_en sample position (i.e., in the middle of the read preamble window) (block 710). The training may use the appropriate clk1x clock cycle boundary (rising or falling edge) and the flexibility of using the delay taps 540 within every clk1x half clock cycle. The operations shown in FIG. 7 may be performed, for example, in a training cycle performed during an initialization period for computing system 100, such as when it is initially powered-up or reset. In other implementations, the operations may be performed at other times, such as at the request of an administrator or at other scheduled times. In general, the training may be dynamically performed for a particular memory controller or memory device while the system is deployed in its operational environment.

The delays determined in block 710 may be set in preamble detection circuit (block 720). Control logic 460 may set the control lines for multiplexers 530 and 550 to correspond to the optimal delay determined in block 710. For example, control logic may set control line 0 to select the output of FF1 510 and may set control lines 1-3 to select the output of delay buffer 540-2.

Figure 8:
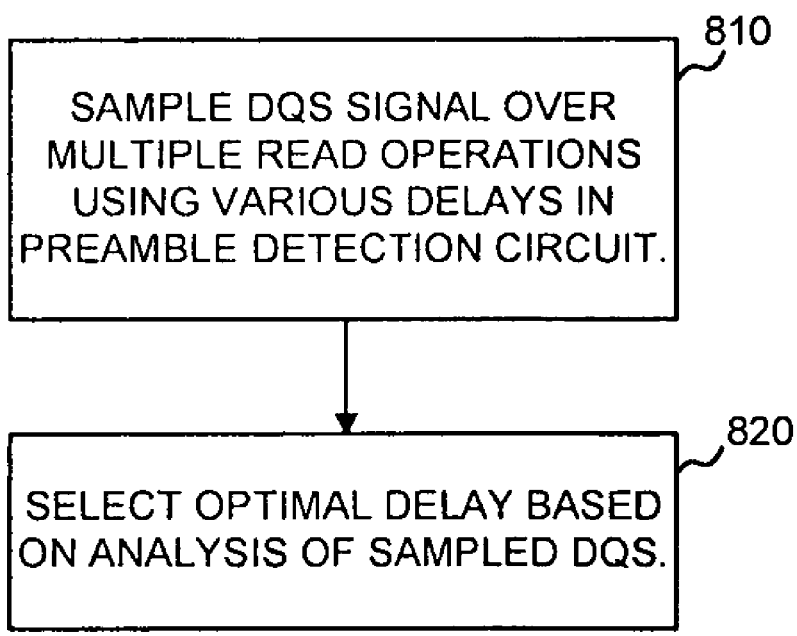
FIG. 8 is a flow chart illustrating exemplary operations associated with the training of a preamble detection circuit.

FIG. 8 is a flow chart illustrating exemplary operations for the training of preamble detection circuit 420, as performed in block 710 (FIG. 7), in additional detail.

Control logic 460 may sample the DQS signal, using dqs_en, across multiple data read cycles using various delays for preamble detection circuit 420 (block 810). More particularly, control logic 460 may use preamble detection circuit 420 to generate multiple dqs_en sample points over a range of clk1x clock cycles using rising and falling clock edges and various tap delays. For instance, memory controller 120 may request multiple data read bursts from memory device 115-1. For each memory burst, dummy test data, such as the eight bits per DQ line shown in FIG. 3, may be transferred from memory device 115-1 to controller 120. For each data burst, control logic 460 may adjust control line 0, for multiplexer 530, and control lines 1-3, for multiplexer 550. This may be repeated until control logic 460 has sampled each combination of the control signals to multiplexer 530 and multiplexer 550. In the implementation shown in FIG. 5, in which there are four total control lines, 16 different sampling combinations are possible. For each sample, the output of flip-flop 470 may be used to determine the state of the DQS signal at the sample. In one implementation, 16 different sampling combinations can be done per memory clock cycle and the process can be repeated over a range of memory clock cycles to have a large enough DQS strobe sample size to determine the location of rising and falling strobe edges, the first valid rising strobe edge, and the preceding preamble window.

Figure 9:
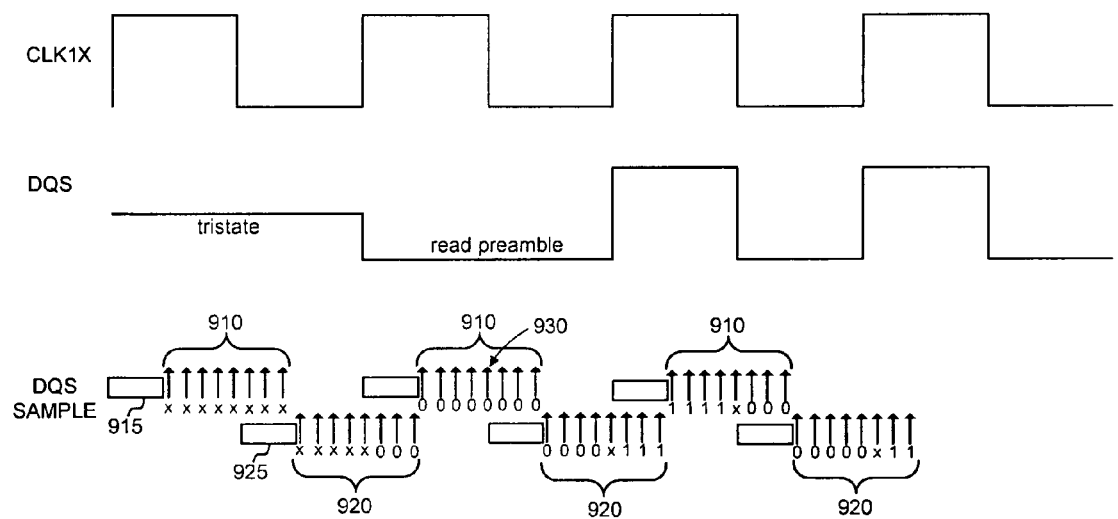
FIG. 9 is an exemplary timing diagram illustrating logic level sampling of a DQS trace using delayed versions of a signal.

FIG. 9 is an exemplary timing diagram illustrating logic level sampling of a DQS trace using delayed versions of a signal. As shown, signal clk1x is a clock signal that has a frequency equal to that of the DQS signal when signaling data. Signal DQS illustrates the DQS signal. Signal "DQS Sample" illustrates sampling points reconstructed from a plurality of DQS samples during training of preamble detection circuit 420. Arrows pointing up represent sampling points in "DQS Sample." Group of arrows 910 may correspond to the selection of FF1 510 (i.e., through control line 0) while control logic 460 iterates through the delay buffers 540-1 through 540-7. The first arrow in each of groups 910 may thus correspond to the multiplexer 550 selecting the input line corresponding to the line in which there is no delay buffer. The second arrow in group 910 may correspond to the multiplexer 550 selecting the input line corresponding to the line in which there is one delay buffer (buffer 540-1). This sample is accordingly delayed by a time delay equal to one buffer delay. The other arrows in group 910 may correspond to the successive selections of delay buffers 540-2 through 540-7. Rectangle 915 may correspond to a minimum delay amount inherent to preamble detection circuit 420. Thus, even though FF1 510 is triggered on the rising edge of CLK1X, the first DQS sample is not received until the time delay indicated by rectangle 915.

DQS samples indicated by group 920 are similar to those in group 910, except the samples shown in group 920 correspond to samples when FF2 515 is selected. Rectangle 925 corresponds to the minimum delay amount inherent to preamble detection circuit 420. As shown in FIG. 9, however, of the 16 samples for one iteration of groups 910 and 920, the sampling technique tends to cover the complete cycle of clk1x despite the delay illustrated by rectangles 915 and 925.

The tap granularity (i.e., the delay of each of buffers 540) and the sampling range may be designed to maximize sampling coverage and to avoid sampling overlap. Although preamble detection circuit 420 is illustrated having eight taps for the rising and eight taps for the falling samples, in alternative implementations, more or fewer than eight taps may be used. In one implementation, the total delay through buffers 540 may be designed to be as large as possible but less than half a period of the sampling clock to maximize sampling coverage and avoid sampling overlap across rising and falling clock edges.

In FIG. 9, the sampled values of the DQS signal are shown below the arrows, where "x" indicates indeterminate, 1 indicates logic high, and 0 indicates logic low. The set of sampled values in FIG. 9 is: xxx xxxxxxxxxx 000000000000000x1111111x00000000x11.

Referring back to FIG. 8, the sampled values may be analyzed to determine an optimal delay (block 820). Control logic 460 may analyze the DQS samples to locate the preamble window. From the sampled values, the preamble window can be located by determining the set of sample logic low values that approximately cover a full cycle of clklx (e.g., approximately 16 zeros in the sampled list). One of the samples may be selected within the preamble window, such as the logic zero sample corresponding to the middle of the preamble window. In other implementations, the selected sample may correspond to another location in the preamble window, such as closer to the beginning or end of the preamble window. In FIG. 9, for example, the selected sample may be the sample labeled as sample 930. In general, the selected sample may correspond to the delay that optimizes stability of detection of the read preamble window. This sample corresponds to multiplexer 530 selecting the output of FF1 510 (positive edge of clk1x) and multiplexer 550 selecting the fifth tap to delay buffers 540 (i.e., the tap after delay buffer 540-4).

In some situations, the tri-state or indeterminate values may be sampled as a long sample of zeros, potentially making it difficult to distinguish the preamble window from tri-state. Given that it is easy to locate the first rising strobe edge from the sampled trace, and that the number of samples per clock cycle is a known value, the center of the preamble window can also be located from the first rising DQS edge.

Figure 10:
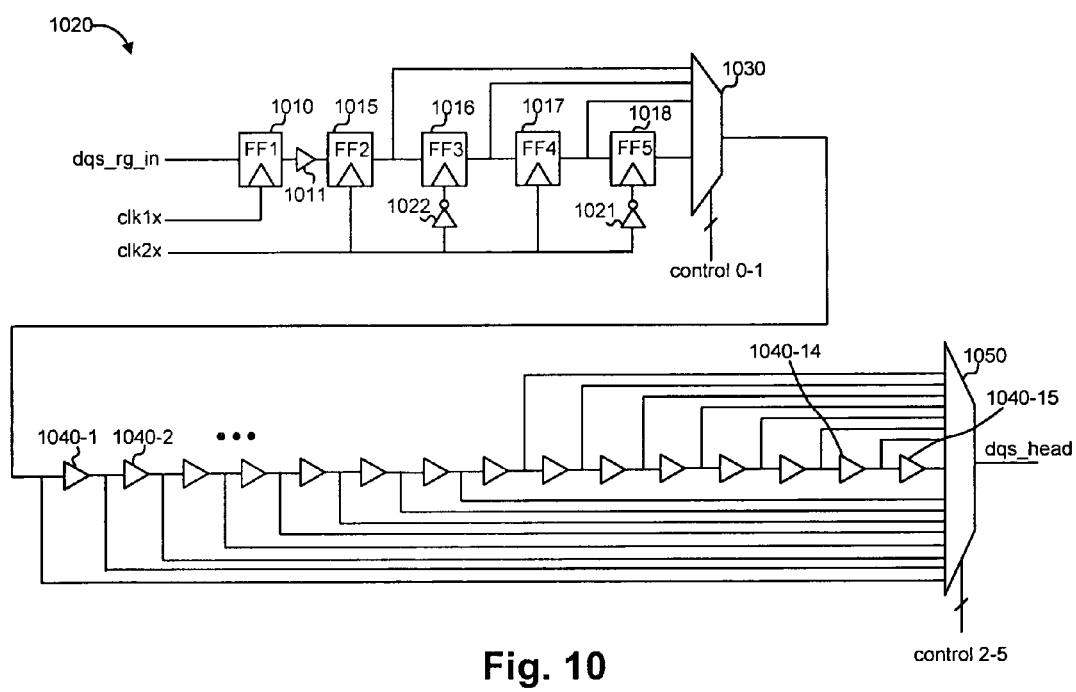
FIG. 10 is a diagram illustrating an implementation of the preamble detection circuit according to an exemplary alternate implementation.

FIG. 10 is a diagram illustrating an implementation of the preamble detection circuit, labeled as preamble detection circuit 1020, according to an exemplary alternate implementation. Preamble detection circuit 1020 is similar to preamble detection circuit 420, except that it additionally uses a clock running at twice the frequency of clk1x (clk2x), four flip-flops to provide an output to a first multiplexer 1030, and a 16-tap delay circuit providing an output to a second multiplexer 1050.

More particularly, as shown in FIG. 10, preamble detection circuit 1020 includes a first flip-flop (FF1) 1010 to sample signal dqs_rg_in. A buffer 1011 may provide the output of FF1 1010 to flip-flop FF2 1015. FF3 1016, FF4 1017, and FF5 1018 may be a series of cascaded flip-flops after FF2 1015. The sampling signal, dqs_rg_in, is driven by the rising and falling edges of clk2x. Inverters 1022 and 1021, connected to the clock inputs of FF3 1016 and FF5 1018, respectively, may cause FF3 1016 and FF5 1018 to be driven off of the negative edge of clk2x. The output of multiplexer 1030 may be input to a 16-tap delay circuit including delay buffers 1040-1 through 1040-15. One of these 16 taps may be selected by multiplexer 1050 as the output "dqs_head" signal. Each of delay buffers 1040 may include, for instance, a buffer that provides approximately 15-40 picoseconds of delay.

Control logic 460 may update the signals used to control multiplexer 1030, control lines 0-1, and the signals used to control multiplexer 1050 (control lines 2-5). For instance, memory controller 120 may request multiple data read bursts from memory device 115-1. For each memory burst, dummy test data, such as the eight bits per DQ line shown in FIG. 3, may be transferred from memory device 115-1 to controller 120. For each data burst, control logic 460 may adjust control lines 0-1, for multiplexer 1030, and control lines 2-5, for multiplexer 1050. Control logic 460 may sample the DQS signal for each combination (or a subset of the possible combinations) of the control signals to multiplexer 1030 and multiplexer 1050 over a range of clk2x rising and falling clock edges. For each sample, the output of flip-flop 470 may be used to determine the state of DQS at the sample.

In FIG. 10, delay through buffers 1040 may be designed to be as large as possible subject to the constraint that the total delay for eight of the buffers 1040 is less than one quarter of a memory clock cycle period in order to maximize coverage and avoid sampling overlap. In some implementations, control logic 460 may use only FF2 1015 and FF4 1017 with all 16 taps during training of preamble detection circuit 1020. In other implementations, control logic 460 may use FF2 1015, FF3 1016, FF4 1017, and FF5 1018 during training but only use 8 of the 16 delay taps. Additionally, in some implementations, fewer than eight taps may be used if training results are adversely impacted by duty cycle distortion on the clk2x clock. In general, the number of taps to use during training may depend on the frequency of clk2x, where more taps may be used when clk2x has a lower frequency.

Figure 11:
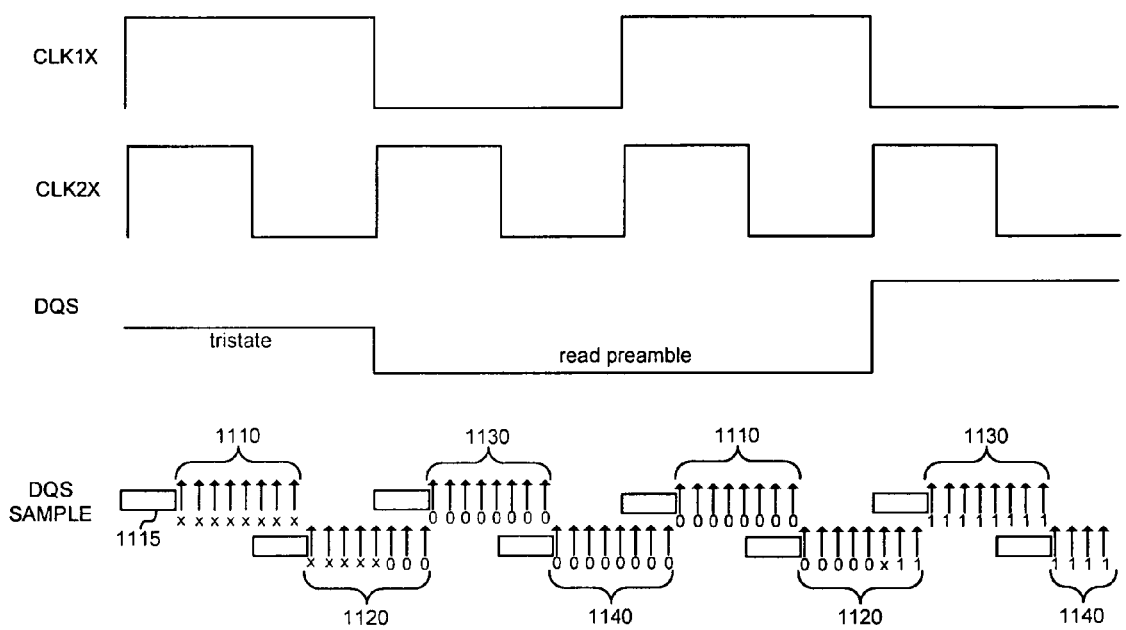
FIG. 11 is an exemplary timing diagram illustrating the timing of signals in the preamble detection circuit shown in FIG. 10.

FIG. 11 is an exemplary timing diagram illustrating the timing of signals in the preamble detection circuit 1020 shown in FIG. 10. As shown, signal clk1x is a clock signal that has a frequency equal to that of the DQS signal when signaling data and signal clk2x is a clock signal that has a frequency equal to that of twice the DQS signal when signaling data. Signal DQS illustrates the DQS signal. Signal "DQS Sample" illustrates sampling points reconstructed from a plurality of DQS samplings during training of preamble detection circuit 1020. Arrows pointing up represent sampling points in "DQS Sample." Arrow groups 1110 may correspond to the selection of FF2 1015 while control logic 460 iterates through delay buffers 1040, arrow groups 1120 may correspond to the selection of FF3 1016 while control logic 460 iterates through delay buffers 1040, arrow groups 1130 may correspond to the selection of FF4 1017 while control logic 460 iterates through delay buffers 1040, and arrow groups 1140 may correspond to the selection of FF5 1018 while control logic 460 iterates through delay buffers 1040. Assume that, in this implementation, 8 taps, corresponding to the first eight delay buffers 1040-1 through 1040-8, are being used. The first arrow in group 1110 may thus correspond to the multiplexer 1050 selecting the input line corresponding to the line in which there is no delay buffer. The second arrow in group 1110 may correspond to the multiplexer 1050 selecting the input line corresponding to the line in which there is one delay buffers (the tap after buffer 1040-1). This sample is accordingly delayed by a time delay equal to one buffer delay. Rectangle 1115 may correspond to a minimum delay amount inherent to preamble detection circuit 1020

In FIG. 11, the sampled values of the DQS signal are shown below the arrows, where "x" indicates indeterminate, 1 indicates logic high, and 0 indicates logic low. The set of sampled values in FIG. 11 is: xxxxxxxxxxxxx0000000000000000000000000000000x11 111111111111.

The analysis of the sample values shown in FIG. 11 may be performed similarly to the sampled values shown in FIG. 9. That is, from the sampled values, the preamble window can be located by determining the set of logic low values that approximately cover a full cycle of clk1x from the left of the start of the first valid DQS rising edge. A tap corresponding to an optimal point with the preamble window may be selected and used during functional operation of the interface.

CONCLUSION

As described above, a memory controller may include read preamble detection and postamble closure circuits. The read preamble detection circuit may be trained to set an optimal clock boundary and delay in the preamble detection circuit for read preamble detection. With the read preamble detection circuit and postamble closure circuits, a window that passes valid strobe edges while effectively filtering out tristate can be determined.

While series of blocks have been described with regard to FIGS. 7 and 8, the order of the blocks may be varied in other implementations consistent with the invention. Moreover, non-dependent blocks may be implemented in parallel.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a memory configured to store data; and
   a memory controller connected to the memory via a plurality of data lines, for receiving data signals, and a strobe line, for receiving a strobe signal used to control reading of the data lines, the memory controller including
      a preamble detection circuit to receive the strobe signal and output a first control signal indicating detection of a preamble window in the strobe signal that indicates a beginning of a read cycle, where the first control signal is delayed based on a selectable delay period applied to the first control signal,
      a first gate to, based on the first control signal, either output the strobe signal for reading of the data lines or block the strobe signal, and
      control logic to set an amount of the selectable delay period for the preamble detection circuit,
      where the control logic is to determine the amount of the selectable delay period during a training cycle in which the strobe signal is sampled over a plurality of data read cycles, and in which, during different ones of the plurality of data read cycles, the selectable delay period is set to different values, and
      where the control logic is to perform the training cycle when the device is initially powered-up or reset.

2. The device of claim 1, where the memory controller further includes:
   a postamble detection circuit to output a second control signal, to the first gate, indicating an end of the read cycle.

3. The device of claim 2, where the postamble detection circuit additionally includes:
   a ring counter configured to count a number of cycles of the strobe signal after detection of the preamble window.

4. The device of claim 2, where the memory controller further includes:
   a second gate connected to receive the first and second control signals and to output a signal to the first gate in response thereto.

5. The device of claim 4, where the second gate includes a logical OR gate.

6. The device of claim 1, where the preamble detection circuit additionally includes:
   a plurality of flip-flops connected to sample the strobe signal on rising and falling edges of a clock cycle;
   a first multiplexer connected to outputs of the plurality of flip-flops and, in response to the control logic, select one of the outputs of the plurality of flip-flops to output from the first multiplexer;
   a plurality of serially connected delay elements connected, at a first of the plurality of serially connected delay elements, to receive an output of the first multiplexer; and
   a second multiplexer connected to, in response to the control logic, output a signal corresponding to one of the serially connected delay elements and provide the output as the first control signal.

7. The device of claim 1, where the memory controller further includes:
   data capture logic connected to receive the plurality of data lines and the strobe signal output from the first gate, the data capture logic sampling data on the data lines based on the received strobe signal.

8. A method implemented in a computing device, the method comprising:
   detecting a beginning of a memory read cycle, in a memory controller, based on a sampling of a data strobe signal in which the data strobe signal is sampled based on a selectable delay that is dynamically determined for the memory controller during an initialization period for the computing device;
   detecting an end of the memory read cycle;
   controlling a gate in the computing device to pass the data strobe signal to a data capture portion of the computing device between the beginning of the memory read cycle and the end of the memory read cycle and controlling the gate to block the data strobe signal to the data capture portion of the computing device otherwise; and
   dynamically determining the selectable delay during a training cycle in which the data strobe signal is sampled over a plurality of data read cycles, and in which, during different ones of the plurality of data read cycles, different delay periods are selected,
   where the training cycle occurs when the computing device is initially powered-up or reset.

9. The method of claim 8, further comprising:
   determining the selectable delay based on an analysis of the sampled strobe signals to determine a delay at which the detection of the beginning of the memory cycle is optimally stable.

* * * * *